US011449723B2

(12) United States Patent
Campiglia et al.

(10) Patent No.: US 11,449,723 B2
(45) Date of Patent: Sep. 20, 2022

(54) METHOD OF PRINTING AN OBJECT HAVING A SURFACE OF VARYING HEIGHT

(71) Applicant: Océ Holding B.V., Venlo (NL)

(72) Inventors: Jean-Marie Campiglia, Paris (FR); Felicia G. Ionascu, Bonneuil-sur-Marne (FR); Cédric T. Valade, Villiers-sur-Marne (FR)

(73) Assignee: CANON PRODUCTION PRINTING HOLDING B.V., Venlo (NL)

( * ) Notice: Subject to any disclaimer, the term of this patent is extended or adjusted under 35 U.S.C. 154(b) by 147 days.

(21) Appl. No.: 16/560,405

(22) Filed: Sep. 4, 2019

(65) Prior Publication Data
US 2020/0084332 A1 Mar. 12, 2020

(30) Foreign Application Priority Data
Sep. 11, 2018 (EP) .................................. 18193718

(51) Int. Cl.
*G06K 15/02* (2006.01)
*B29C 64/386* (2017.01)
(Continued)

(52) U.S. Cl.
CPC .......... *G06K 15/1868* (2013.01); *B29C 64/10* (2017.08); *B29C 64/386* (2017.08);
(Continued)

(58) Field of Classification Search
None
See application file for complete search history.

(56) References Cited

U.S. PATENT DOCUMENTS 8,976,415 B2 3/2015 Klein Koerkamp et al.
10,523,914 B1 * 12/2019 Phillips ................. H04N 7/157
(Continued)

FOREIGN PATENT DOCUMENTS

EP 2 946 934 A1 11/2015

OTHER PUBLICATIONS

European Search Report of application 18 19 3718 dated Feb. 26, 2019.

*Primary Examiner* — Philip C Tucker
*Assistant Examiner* — Evan T Hulting
(74) *Attorney, Agent, or Firm* — Birch, Stewart, Kolasch & Birch, LLP

(57) ABSTRACT

A printing system and method of printing a digital image resulting in an elevated print on a support. The elevated print has a surface of varying height. The printing system is configured to print a number of pass images on top of each other in a number of passes. The definition of the digital image comprises color data for each pixel of the digital image and height data for indicating a height of each pixel of the digital image. A raster image processor is connected to the printing system and rasterizes the digital image into a raster image. A digital slicer is connected to the printing system and derives from the raster image a number of pass images to be printed on top of each other. The printing system is then printing the pass images on top of each other by applying a number of recording materials on the support. The printing system receives information related to the print order of the recording materials in the pass images for each pass pixel for establishing a special effect. From the received information the print order of the recording materials in the pass images for each pass pixel is derived and the recording materials are printed according to this print order for each pass pixel of each pass image.

8 Claims, 6 Drawing Sheets

(51) Int. Cl.
    *B29C 64/10*       (2017.01)
    *H04N 1/00*       (2006.01)
    *H04N 1/54*       (2006.01)
    *B41J 3/407*     (2006.01)

(52) U.S. Cl.
    CPC ........ *B41J 3/4073* (2013.01); *H04N 1/00827* (2013.01); *H04N 1/54* (2013.01)

(56) References Cited

U.S. PATENT DOCUMENTS

| | | |
|---|---|---|
| 2009/0207458 A1 | 8/2009 | Doggett, III et al. |
| 2009/0207487 A1* | 8/2009 | Feldmann ........... G03F 7/70225 359/364 |
| 2015/0042716 A1* | 2/2015 | Beier .................. B25J 11/0075 347/14 |
| 2016/0318258 A1 | 11/2016 | Valade |
| 2017/0355145 A1* | 12/2017 | Valade .................. B33Y 50/02 |

* cited by examiner

METHOD OF PRINTING AN OBJECT HAVING A SURFACE OF VARYING HEIGHT

BACKGROUND OF THE INVENTION

1. Field of the Invention

The present invention relates to a method of printing a digital image resulting in an elevated print on a support, said elevated print having a surface of varying height, by a printing system configured to print a number of pass images on top of each other in a number of passes, the method comprising the steps of defining the digital image comprising color data for each pixel of the digital image and height data for indicating a height of each pixel of the digital image, a raster image processor connected to the printing system rasterizing the digital image into a raster image, a digital slicer connected to the printing system deriving from the raster image a number of pass images to be printed on top of each other, and printing the pass images on top of each other by applying a number of recording materials on the support.

The term "printing" or "print" refers to building an object from print material by additive manufacturing, and includes, in particular, jetting print material for depositing the print material on the support or an already printed portion of the object.

The term "recording material" refers to types of ink or other printable fluids like varnish, etc.

The term "elevated print" may also be called "relief print".

The term "digital slicer" may also be called "elevated printing raster image processor", "2.5D raster image processor" or "special effect raster image processor".

2. Description of the Related Art

Recently, print systems have been developed that allow to print multilayer structures that can reach a considerable height as compared to conventionally printed images that are basically flat, or, at least, the height of which is generally disregarded. The structures are generated by stacking layers of material on top of each other. For example, radiation curable ink, in particular UV curable ink, may be used. By repeatedly printing a layer on top of a previously printed, cured layer, a multilayer structure may be built up having a defined height. For example, the height may be up to 10 mm or more. The height, i.e. the thickness of the printed structures, adds an extension in a further dimension to the two dimensional image, and, accordingly, such prints are termed 2.5D prints or relief prints. The printed structure may comprise an image, e.g. a color image. U.S. Pat. No. 8,976,415 describes a method for generating relief prints, including processing a relief image, comprising color channels for indicating a color of each pixel and a height channel for indicating a height of each pixel, into several passes that are printed using a printer with several colorants including a white colorant. For each pixel a relief part, a white part and a skin part are discriminated. A height variation of individual pixels is caused by repetitive printing of colorants in the relief part. A number of pass images are derived from the relief image to be printed on top of each other. All available colorants may be used in the relief part, in order to provide for an optimal print speed for this part. The skin part comprises pass pixels for which a colorant composition based on the color channels of the relief image is established. A pass pixel is a part of the pixel which is intended to be deposited in a related pass.

For printing relief prints or 3D prints, an object is built by stacking layers of material on top of each other. A slicing technique is known that consists in decomposing the object into a set of horizontal layers, which are printed on top of each other.

Special effects for the visual outcome of the print like gloss variation in the print introduces application of other kind of recording materials than ink, for example varnish. Multiple kinds of recording materials make the printing of a relief print rather complicated. A special effect is to be read as a visual effect for the observer of the print.

It is an objective of the invention to provide a method and a system that facilitate printing of relief prints or 3D prints with multiple kinds of recording materials to establish a relief or 3D printed object.

SUMMARY OF THE INVENTION

According to one aspect of the present invention, this objective is achieved by the method according to the present invention, wherein the method comprises the steps of
  receiving digital information related to the print order of the recording materials in the pass images for each pixel,
  transferring the digital information to the digital slicer,
  deriving from the digital information the print order of the recording materials in the pass images for each pixel, and
  applying the recording materials for each pixel for each pass image derived by the digital slicer.

The elevated print has a surface of varying height, in particular of a height in a thickness direction or Z-direction that varies over X,Y-coordinates of the support. The height of the pixels corresponds to an extension or thickness of the pixels in the Z-direction. The elevated print is composed of slices derived from pass images. The slices are printed on top of each other. However, in order to achieve a particular special effect multiple recording materials have to be applied in a print order which is defined per pass pixel, i.e. for each pixel for each pass. The digital information related to the print order of the recording materials in the pass images for each pass pixel may be received via a user interface of the printing system. The digital information may be an identifying name of the special effect which is coupled to a number of recording materials to be applied in a specific print order per pixel column of pass pixels. The digital information determines a visual effect of the elevated print.

A first example of a special effect is the opaque effect, wherein an elevation recording material is deposited first on the support, then a white undercoat recording material and then a colored recording material layer on top.

Another example of a special effect is a varnish elevation effect, wherein an optional white undercoat layer is deposited on the support, then a colored recording material, and then a varnish recording material for the elevation for the relief in the print.

By interchanging the print order in which the pixel columns are vertically arranged as well as the type of recording material use to print them, another type of special effect may be obtained.

The digital information of the print order of the recording materials is transferred to the digital slicer. The digital slicer is a software tool that is installed in the printing system. The digital slicer is configured to derive from the raster image a number of pass images to be printed on top of each other. The pass images are extending in an X,Y direction in the plane of the support.

Since the print order of the different recording materials is crucial to achieve a specific special effect, the print order of the recording materials in the pass images for each pixel is derived from the digital information.

The recording materials are deposited for each pixel of each pass image derived by the digital slicer according to the derived print order.

According to an embodiment the step of transferring the digital information to the digital slicer comprises the sub-step of circumventing the raster image processor. If the digital information would be encoded in the color data of the digital image for each pixel or in the height data of the digital image, the print order would be part of the data that is going to be rasterized by the raster image processor. However, the outcome of the rasterizing of the print order data is unpredictable and not suitable at all since the raster image processor according to the invention is only suitable to rasterize image data with respect to color or height of the elevated print. Therefore, according to the embodiment the digital information is directly transferred to the digital slicer and thus circumventing the raster image processor.

According to an alternative embodiment the step of transferring the digital information to the digital slicer comprises the sub-step of the raster image processor receiving the digital information and transferring the digital information unchanged to the digital slicer. Nowadays raster image processors are available which can transfer data unchanged to the digital slicer. For example, a spot color image may be used to transfer the digital information unchanged to the digital slicer. According to another embodiment the spot color image comprises a URL at which the digital information is stored in detail, amongst others the print order of the recording materials.

According to an embodiment the step of receiving the digital information comprises the sub-step receiving multiple print orders for different sub-images of the digital image. By doing so, the digital print may comprise more than one special effect for the observer of the print.

According to a further embodiment the step of the digital slicer deriving from the raster image a number of pass images to be printed on top of each other, comprises the sub-step of adapting for each sub-image the number of pass images of recording materials.

By doing so, an equally leveled building up of the relief print is achieved leading to a better print quality. By said pass images, sequences of pass pixels and of corresponding pass pixel heights are assigned to pixels of the image. Due to said print order of recording materials, the composition of said sequences of pass pixel heights from different positive pass pixel heights may vary for respective pixels of the digital image. In a digital image different areas may be specified to have different special effects.

The invention also relates to a print system for printing a digital image resulting in an elevated print on a support, said elevated print having a surface of varying height, in a number of pass images on top of each other in a number of passes, the print system comprising a print controller configured to define the digital image comprising color data for each pixel of the digital image and height data for indicating a height of each pixel of the digital image, a raster image processor connected to the printing system and configured to rasterize the digital image into a raster image, a digital slicer connected to the printing system and configured to derive from the raster image a number of pass images to be printed on top of each other, and a print engine configured to print the pass images on top of each other by applying a number of recording materials on the support, wherein the print system is configured to receive digital information related to the print order of the recording materials in the pass images for each pixel, to transfer the digital information to the digital slicer, to derive from the digital information the print order of the recording materials in the pass images for each pixel, and to apply the recording materials for each pixel for each pass image derived by the digital slicer.

The invention further relates to a non-transitory software medium comprising executable program code configured to, when executed, perform the method according to the invention.

Preferred embodiments are indicated in the dependent claims.

BRIEF DESCRIPTION OF THE DRAWINGS

Embodiment examples of the invention will now be described in conjunction with the drawings, wherein.

DETAILED DESCRIPTION OF EMBODIMENTS

Figure 1:
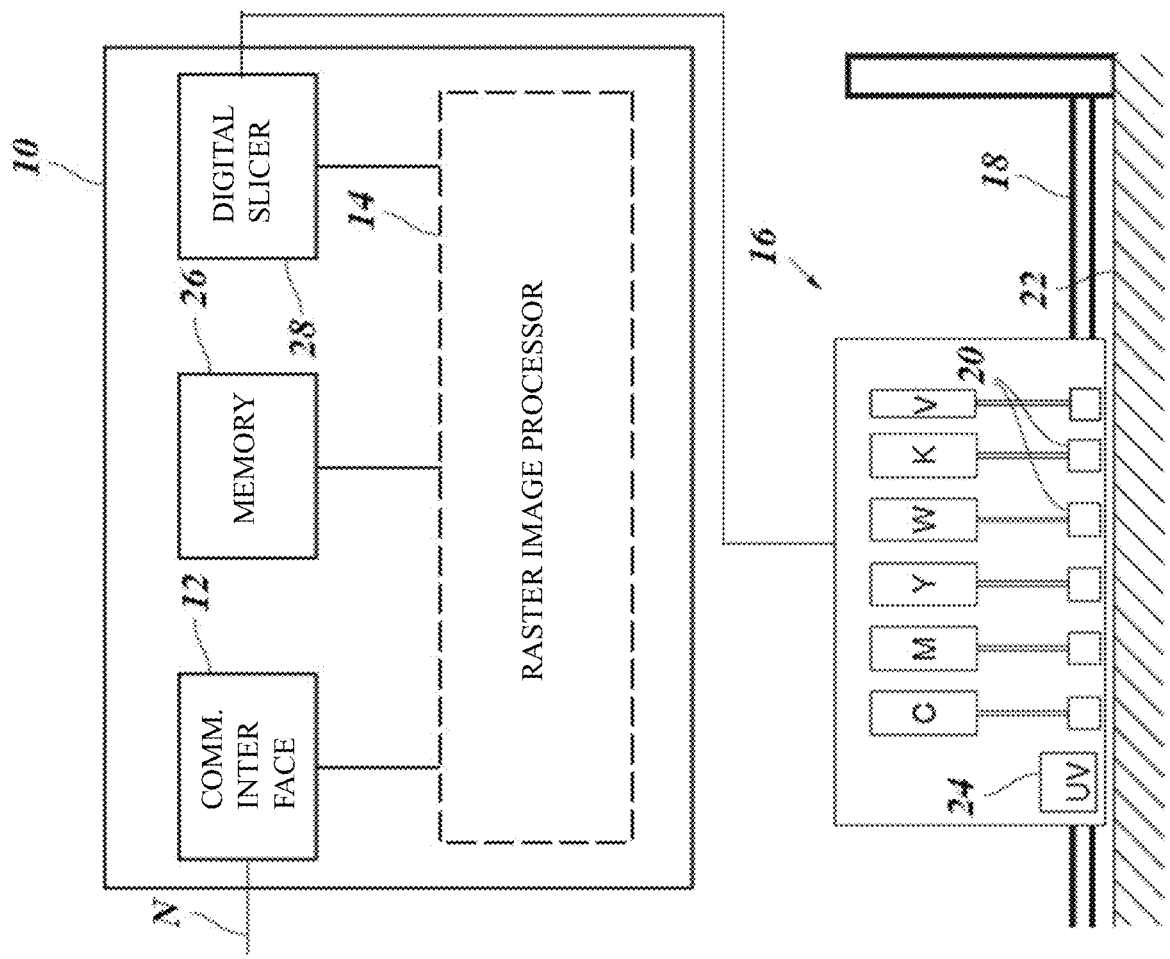
FIG. 1 is a block diagram of a printing system according to the invention.

FIG. 1 schematically shows a print system for printing 2.5D objects by depositing material on a support in a number of printing passes. A print controller 10 receives print data in the form of a digital image comprising height data, e.g. in the form of a height channel, for indicating a height of each pixel of the digital image, and comprising color data, e.g. in the form of a number of color channels, for indicating a color of each pixel. For example, there are five customary color channels for colorants of the colors cyan (C), magenta (M), yellow (Y), white (W), black (K). For special effects there is a varnish channel for varnish (V). The height data specify, for two-dimensional print coordinates X, Y, the height of the respective pixel of the image. The height data describes a height, i.e. a thickness, of the elevated print in the third dimension Z.

The print controller 10 includes a communication interface 12 connected e.g. to a network N for receiving the print data and the information related to the print order of the recording materials in the pass images for each pixel as according to the invention, and a raster image processor 14 configured for converting the print data into a number of pass images in a format suitable for driving a print engine 16 synchronized with a motion control system 18 configured for controlling relative motion between print heads 20 of the print engine 16 and a support 22. The motion control system 18 comprises print carriage motion controllers of first and second printing directions X, Y and, optionally a print carriage height controller 19 for controlling a height of the print heads 20 above the support 22. For example, the motion control system 18 is configured to control relative motion between the print heads 20 and the support 22 in the X, Y, and Z direction. The print heads have nozzles for jetting the colorants onto the support. The print system is a system for printing relief prints using UV curable ink and includes a UV curing device 24. At least one of the print heads 20 may also be used for depositing varnish (V) or any kind of other recording material towards the support 22 in order to establish special effects like gloss, elevation, etc.

The print controller 10 further comprises a memory 26 and a digital slicer 28 in the form of a programmed application, which may be implemented in software and/or hardware.

The raster image processor 14 receives the digital image comprising height data and color data, and thereby defines the raster image. From the raster image, the digital slicer 28 derives a number of pass images, and the pass images are printed. The steps of deriving the number of pass images and printing may overlap or be performed in parallel. For example, pass images may sequentially be derived, in the order from bottom to top. For example, deriving and printing the pass images may be interweaved or interlaced in time.

In the following, printing of a 2.5D object will be exemplarily explained with respect to FIGS. 2-4.

Figure 2:
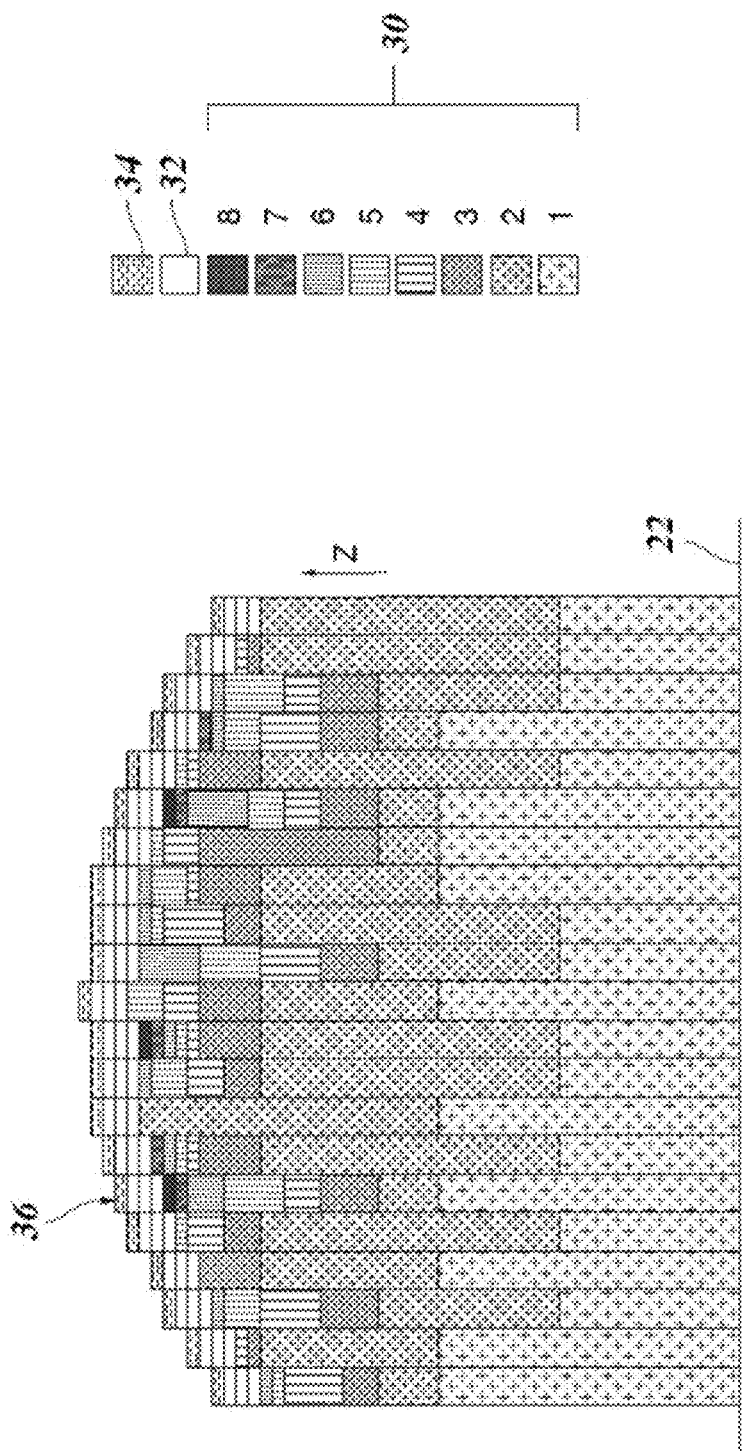
FIG. 2-4 are schematic illustrations of relief prints for illustrating different print orders of recording materials according to the invention.

FIG. 2 is a cross cut of a 2.5D structure printed in a number of printing passes. The structure is built up of a number of pass images 1, 2, 3, 4, . . . which are printed on top of each other. FIG. 2 shows a relative height of individual pass pixels of the pass images. Different filling patterns are used to indicate the different pass images. The numbers of the pass images, to which the pass pixels belong, are indicated with the associated filling patterns. The pass images comprise pass images that include pass pixels of two or more different heights.

FIG. 2 shows an example in which the earlier mentioned opaque effect is established. The structure comprises three parts or layers that are printed on top of each other: an elevation part 30 having a varying height, a white part 32 that covers the elevation part 30, and a skin part 34 on top of the white part 32. The skin part 34 forms the top surface 36 of the structure and reproduces e.g. an image by different colors. The overall height of the structure is determined by the height of the elevation part 30, the height of the white part 32, which e.g. may be constant, and the height of the skin part 34. However, the height of the skin part 34 may be neglected, as its function is to reproduce the image according to the color data of the digital image. The elevation part 30 is printed with arbitrary colorants. The white part 32 is printed mainly with white colorant, in order to provide a background of uniform hue and brightness for the colored skin part 34.

When deriving the sequence of pass images, the height reached by the respective pass pixel determines which part the pass pixel belongs to, e.g. to the elevation part 30, the white part 32, or the skin part 34.

Figure 3:
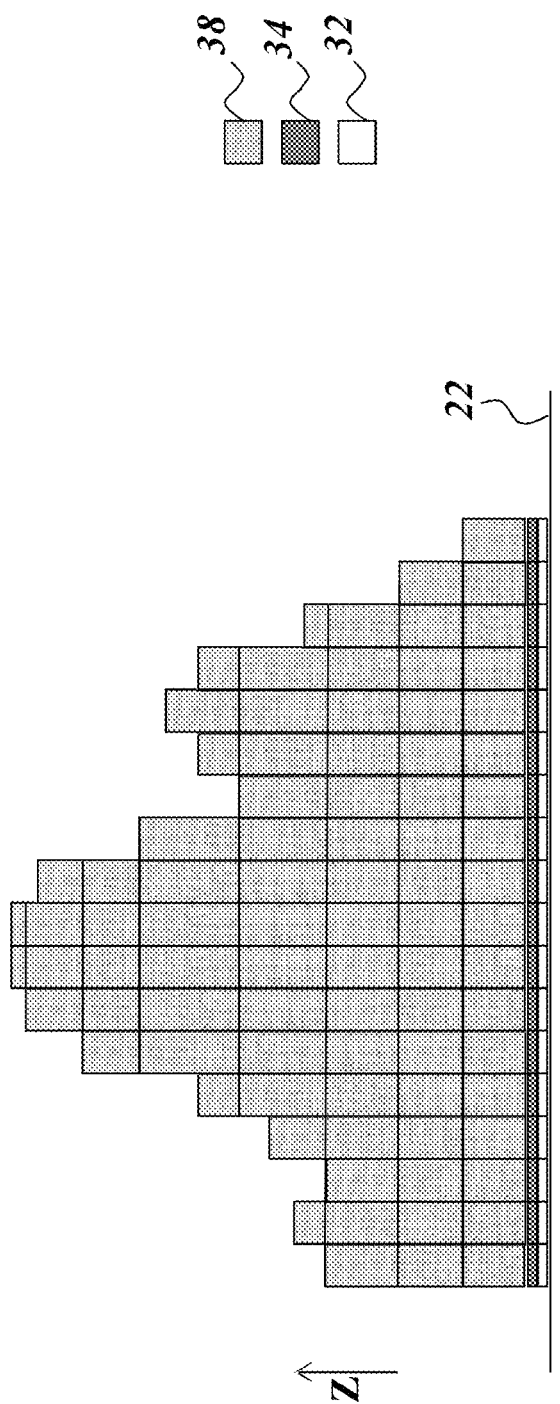

FIG. 3 shows an example in which the earlier mentioned varnish elevation effect is established. The structure comprises three parts or layers that are printed on top of each other: an optional white part 32 having a constant height to be deposited on the support 22, a color part 34 that reproduces e.g. an image by different colors, and a varnish elevation part 38 on top of the color part 34. The varnish elevation part 38 forms the top surface of the structure and gives the image a certain glance. The overall height of the structure is determined by the height of the white part 32, the height of the color part 34, which e.g. may be constant, and the height of the varnish elevation part 38. However, the height of the color part 34 may be neglected, as its function is to reproduce the image according to the color data of the digital image. The varnish elevation part 38 is printed with varnish from the varnish channel V as depicted in FIG. 1. The color part 34 is printed with arbitrary colorants. The white part 32 is printed mainly with white colorant, in order to provide a background of uniform hue and brightness for the colored part 34.

Figure 4:
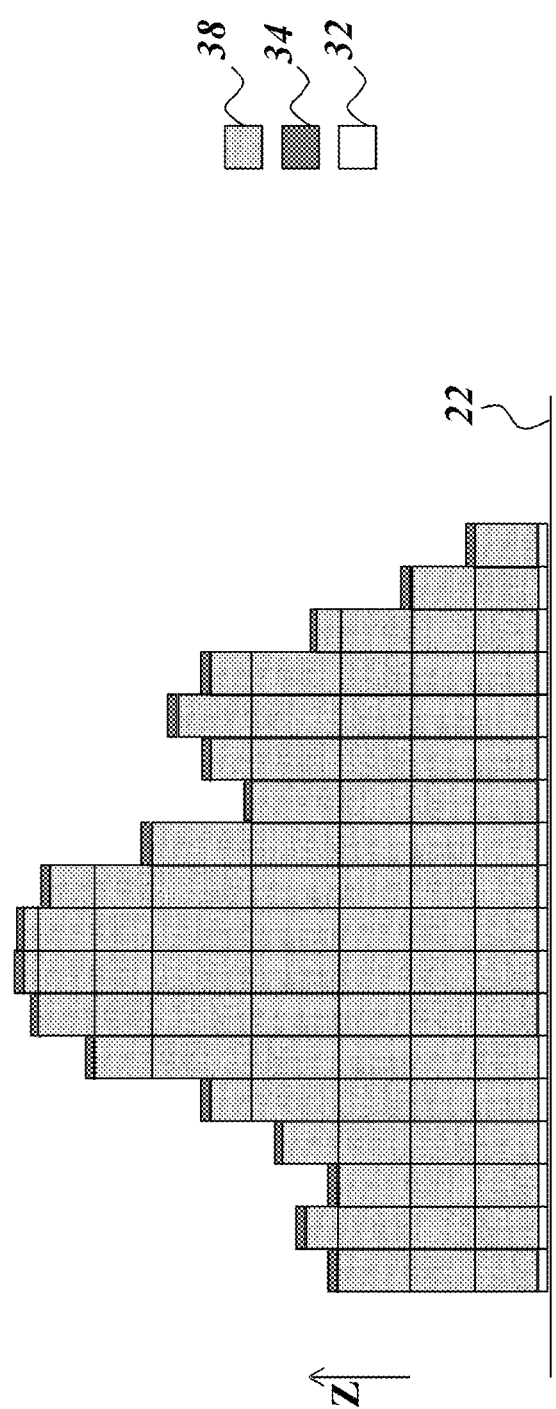

FIG. 4 shows an example in which a translucent elevation effect is established. The structure comprises three parts or layers that are printed on top of each other: an optional white part 32 having a constant height to be deposited on the support 22, a varnish elevation part 38 on top of the white part 32, and a color part 34 that reproduces e.g. an image by different colors, on top of the varnish elevation part 38. The color part 34 forms the top surface of the structure and the varnish elevation part 38 beneath the color part 34 gives the image a certain translucency. The overall height of the structure is determined by the height of the white part 32, the height of the elevation varnish part 38, which is of varying height, and the height of the color part 34. However, the height of the color part 34 may be neglected, as its function is to reproduce the image according to the color data of the digital image. The varnish elevation part 38 is printed with varnish from the varnish channel V as depicted in FIG. 1. The color part 34 is printed with arbitrary colorants. The white part 32 is printed mainly with white colorant, in order to provide a background of uniform hue and brightness for the colored part 34.

Since the print order of the recording materials is defined per pixel of the digital image, the special effects shown in FIGS. 2, 3 and 4 may be combined for sub-images of the digital image. By doing so, different effects may be combined in different areas of one design.

If a plurality of digital images is intended to be simultaneously printed on at least one support, for example in at least one print job, different designs may be combined on the at least one support.

By means of a user interface of the printing system a glossiness value of the surface for the varnish elevation effect may be defined and controlled by varying a height of the varnish elevation part 38 per pixel of the digital image.

By means of the user interface a translucency value of the surface for the translucent elevation effect may be defined and controlled by varying a height of the varnish elevation part 38 per pixel of the digital image.

According to an embodiment the print order per pixel is transferred to the digital slicer 28 via the raster image processor 14 (See FIG. 1). The raster image processor 14 receives the print order and transfers the print order unchanged to the digital slicer 28. Nowadays raster image processors are available which can transfer data unchanged to the digital slicer. For example, the print order may be encoded in images being part of a PDF file, for example in a so-called 8-bit spot color image. By doing so, the defining of the print order is flexible without impacting the rasterizing process executed by the raster image processor 14. Also the information regarding the print order is detectable and conservable when transformations like cropping, scaling, overlapping and nesting a re performed on the digital image by the raster image processor 14. Another advantage is that the use of the spot color image according to the invention is compatible with an existing workflow which uses the raster image processor 14. The height information may still be encoded in 16 bits in order to encode more elevation information (0 to 16384 values). If the raster image processor does not support 16 bit images, two spot color images encoded on 8 bits may be used in order to encode the same height map. One spot color image may encode the 8 most significant bits of the height map, while the other spot color image may encode the 8 least significant bits of the height map information. Furthermore different special effects may be printed productively in one print job.

Figure 5:
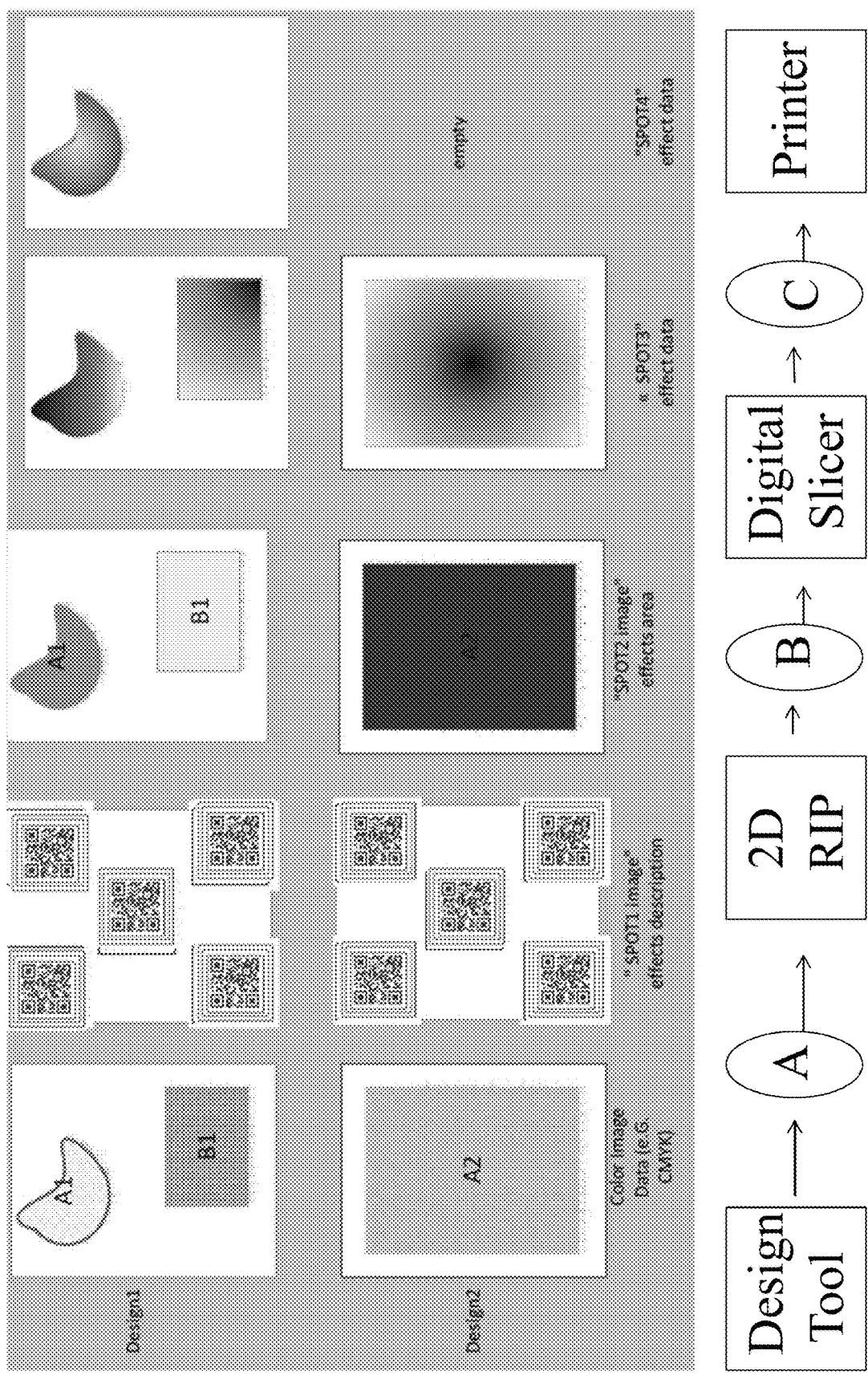
FIG. 5 is a flow and structure diagram illustrating a method of processing the digital image according to the invention.

FIG. 5 shows an example of encoding of the print order for the special effects in a PDF file. In order to describe the elevated printing effects that a design may contain, the PDF file comprises color and height information and several images named spot colors which are enumerated SPOT1, SPOT2, . . . etc, hereinafter.

SPOT1 and SPOT2 images are chosen to have special meanings.

The SPOT2 image encodes what effect is represented for each pixel. Different effects may be defined in the same design and applied to different areas of the design. The SPOT1 image encodes, e.g. by using a QR code, a description of the effects embedded in the file. The description may comprise amongst others a bounding box of the design, i.e. a rectangle encompassing a current design, or a link to an image containing information of the design contour, e.g. a cut path, a list of effects defined in the design file, a recipe for each effect, and a list of images (SPOT3, SPOT4) representing logical layers that contribute to the achievement of the effect (e.g. varnish elevation, white underground, opaque elevation, gloss map, opacity, cut contour, etc.).

The recipe for each effect describes what the other images (SPOT3, SPOT4) represent, e.g. a height map, design contour, cut path, glossiness, etc., with regard to the effect, the print order in which the images SPOT3, SPOT4 have to be processed in order to achieve the intended effect, effect parameter values, for example a maximum elevation.

A design tool delivers a first data set A comprising a PDF with color design data and a list of spot colors. The first data set A is transferred to the 2-dimensional raster image processor for transforming and rasterizing. The raster image processor delivers a second data set B comprising a rasterized color file and again the list of spot color files. The second data set B is transferred to the digital slicer for creating print layers, i.e. pass images. The digital slicer delivers a third data set C comprising a list of elevated printing files, i.e. the pass images, to the printer, for example an inkjet printer.

According to FIG. 5 two designs are processed, Design1 and Design2.

Design1 has two special effects (A1 and B1) on two areas. The effect A1 is built from two data images (stored in SPOT3 and SPOT4 images). The effect B1 is built from one data image stored in SPOT3 image.

Design2 has one special effect A2 on one area. The effect A2 is built from information of one SPOT3 data image.

Two PDF's may be nested by the raster image processor combining the corresponding items like color pages and each spot color.

An image overlap, a cropping and a scaling may also be processed in the raster image processor, for example with SPOT1 and SPOT2. The same process will happen with all other components like color data, and the other spot colors.

At the output of the raster image processor—result B—the QR code in SPOT1 goes through the same transformations as the color page. Therefore, the digital slicer is able to detect a scale factor and a crop that was applied. In case of overlap of two areas with different recipes for special effects the digital slicer detects which recipe has been put on top by the user in the raster image processor. All this information is needed when processing the print job in the digital slicer, so that the correct recipe is processed for each pixel.

In another embodiment the images SPOT1, SPOT2, SPOT3, SPOT4 comprise an image identifier for each referenced image as well as the location of the image identifier in the related image. This is advantageous since by doing so, a relation between an effect description in SPOT1 and the other images SPOT2, SPOT3 and SPOT4 is established.

In this way the method is resistant to up/down scaling of the image that may occur in the raster image processor and hence may use the QR code. The image identifier may be encoded in multiple areas in a referenced image to be better resistant to cropping of the design that may occur in the design phase. Spatial locations where the image identifier has been encoded in the referenced images may be listed in the SPOT1 image containing the effect descriptions.

For decoding the special effect, the digital slicer looks for the SPOT1 image by parsing the SPOT images that result from the raster image process, for example, by looking for the QR code(s) that represent the effect specifications.

From the specification found in the SPOT1 image, the digital slicer reads a list of image identifiers for the images involved in the special effects, as well as optional spatial locations where to find the corresponding image identifiers encoded in the images. For each non identified SPOT image, the digital slicer looks for the image identifiers of the images to retrieve. The image identifiers are encoded in multiple areas of the image in order to increase a chance to resist cropping.

If one of the steps described here-above fails, an error may be raised with error details, for example what image is missing.

According to another embodiment the SPOT1 image comprises a URL at which the information with respect to the print order is stored. This is advantageous since the recipe for the special effect embedded in the information may be adapted, improved at the URL location, for example in the cloud, without changing the spot color image itself.

According to a further embodiment the step of the digital slicer deriving from the raster image a number of pass images to be printed on top of each other, comprises the sub-step of adapting for each sub-image the number of pass images of recording materials. This embodiment will be further elucidated hereinafter.

The multiple special effects in the digital image (print job) have to be spatially taken into account simultaneously in order to create printable pass images intended to be stacked on each other. Due to the differences in the nature of build-up structures when mixing different effects, it is required that each pass image must approximately homogeneously increase in height everywhere in the horizontal X, Y plane, whatever special effect is to be printed at certain regions of the printable area.

An implication is that for a pass image, if one print head V is used to deposit varnish droplets for the varnish elevation effect, then a same equivalent volume of the CMYKW print heads must be deposited for other regions that have the opaque effect.

Therefore, in this embodiment the digital slicer 28 is configured to ensure that the averaged deposited volume is consistent across layers corresponding to the pass images. By doing so, the print head height in the sequence of layers of recording material corresponding to the pass images is automatically adjusted to ensure an optimal firing distance with respect to the print quality.

A grow factor of the thickness of the elevated print is then limited by the special effect that is most constrained by induced volume requirements and printing system capabilities.

In a first example, the grow factor may be limited by a constraint related to the chosen layer based print mode, i.e. a print mode of the print engine of the printing system with a higher or lower print resolution, for a specific region in combination with a special effect chosen that would force a part of the elevated print to be printed with a chosen layer based print mode only.

In a second example, in the case of mixing an opaque effect and a varnish elevation effect, the varnish elevation effect requires varnish embossing. As a result, and unlike the recipe for the opaque effect which can make use of a combination of several print heads CMYKW and droplet sizes, only one print head V can usually be used to the varnish embossing.

The varnish volume deposition is thus a limiting factor that also puts constraints over the opaque effect build-up print order. The constraint can be implemented by reducing either a number of print heads intended to be used for the opaque effect or by reducing the volume of the droplets for the opaque effect.

If one special effect is realized in the elevated print so far whereas other effect are still continuing to be printed, the limiting factor is no more relevant at this phase of the print. The layer thickness can be dynamically increased and adjusted to speed up the process of recording material volume deposition by still ensuring an optimal print quality. As a result, the proposed method establishes that the remaining layers are generated with optimal print volume according to the printing system capabilities. By doing so, the overall print job can be printed with the best productivity-print quality trade off.

Figure 6:
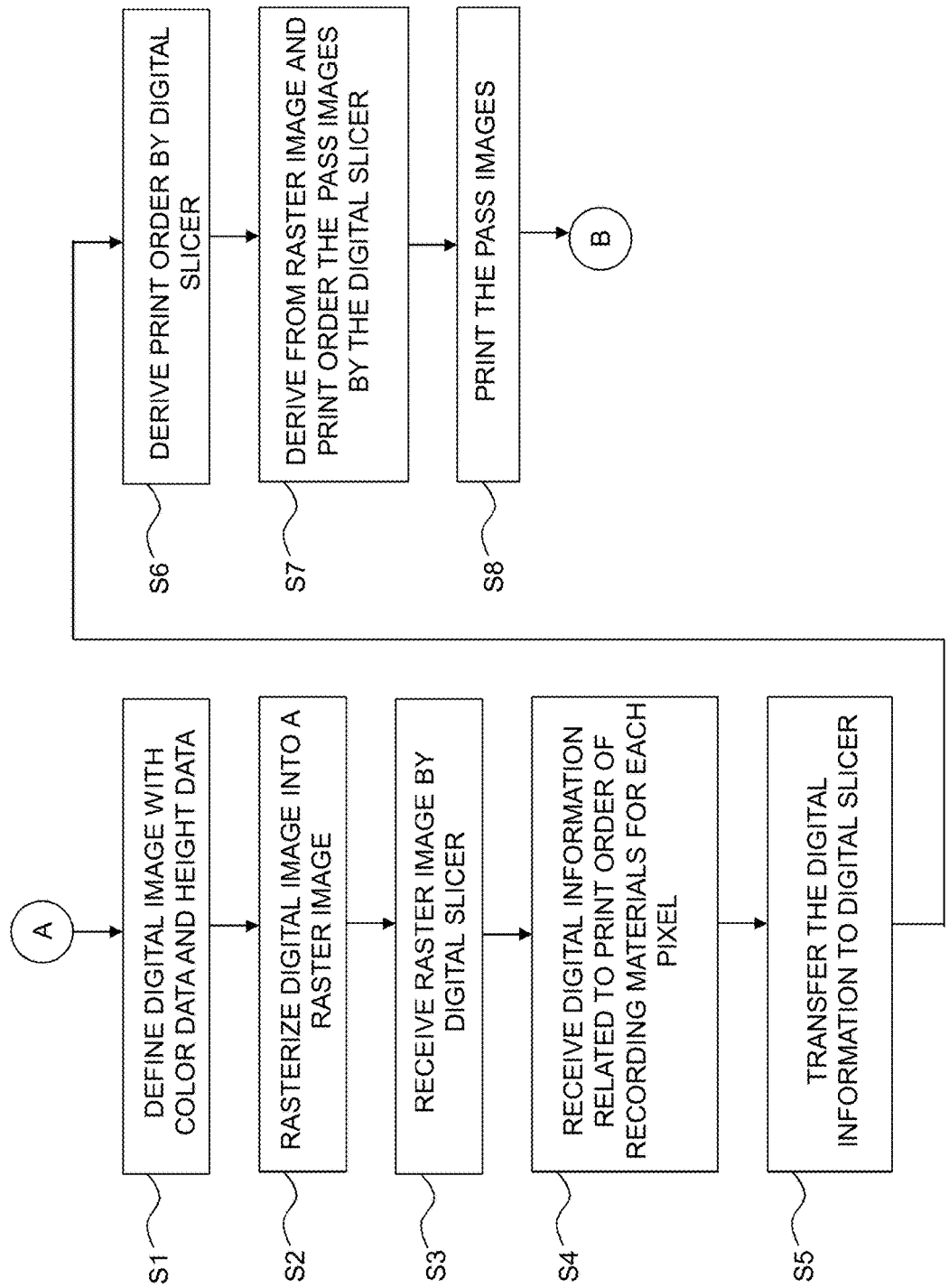
FIG. 6 is a flow diagram illustrating the method according to the invention.

FIG. 6 is a flow diagram illustrating the method according to the invention. The method starts in a starting point A leading to a first step S1.

In the first step S1 the digital image is defined which comprises the color data for each pixel of the digital image and the height data for indicating a height of each pixel of the digital image.

In a second step S2 the raster image processor which is connected to the printing system rasterizes the digital image into a raster image.

In a third step S3 the digital slicer which is connected to the printing system receives the raster image from the raster image processor.

In a fourth step S4 the digital slicer receives digital information related to the print order of the recording materials in the pass images for each pixel. The digital information may be received via a user interface of the printing system, for example in the print job settings.

In a fifth step S5 the digital information is transferred to the digital slicer.

In a sixth step S6 the digital slicer derives from the digital information the print order of the recording materials in the pass images for each pixel.

In a seventh step S7 the digital slicer derives from the raster image and from the print order of the recording materials derived in the sixth step S6, a number of pass images to be printed on top of each other.

In an eight step S8 the print engine prints the pass images on top of each other by applying the number of recording materials on the support for each pixel for each pass image derived by the digital slicer.

The method ends in an end point B.

The invention being thus described, it will be obvious that the same may be varied in many ways. Such variations are not to be regarded as a departure from the invention, and all such modifications as would be obvious to one skilled in the art are intended to be included within the scope of the following claims.

The invention claimed is:

1. A method of printing a digital image resulting in an elevated print on a support, said elevated print having a surface of varying height, by a printing system configured to print a number of pass images on top of each other in a number of passes, the method comprising the steps of:
    defining the digital image comprising color data for each pixel of the digital image and height data for indicating a height of each pixel of the digital image;
    a raster image processor connected to the printing system rasterizing the digital image into a raster image;
    a digital slicer connected to the printing system deriving from the raster image a number of pass images to be printed on top of each other;
    printing the pass images on top of each other by applying a number of recording materials on the support;
    receiving digital information related to the print order of the recording materials in the pass images for each pixel in order to achieve a visual effect;
    transferring the digital information to the digital slicer;
    deriving from the digital information the print order of the recording materials in the pass images for each pixel; and
    applying the recording materials for each pixel for each pass image derived by the digital slicer,
    wherein the step of transferring the digital information to the digital slicer comprises the sub-step of the raster image processor receiving the digital information and transferring the digital information unchanged to the digital slicer,
    wherein the sub-step of the raster image processor transferring the digital information comprises the step of using a spot color image to transfer the digital information unchanged to the digital slicer,
    wherein the visual effect is at least one out of a translucent elevation effect and a varnish elevation effect,
    wherein the translucent elevation effect is established by first a white part layer, then a varnish elevation part layer, and then a color part layer, the white part layer, the varnish elevation part layer, and the color part layer being printed on top of each other,
    wherein the varnish elevation effect is established by first the white part layer, then the color part layer, and then the varnish elevation part layer, the white part layer, the color part layer, and the varnish elevation part layer being printed on top of each other,
    wherein the varying height of the elevated print is provided by a varying height of the varnish elevation part layer,
    wherein the printing system comprises color channels for color inks (C, M, Y, W, K) and a varnish channel for varnish (V), and
    wherein the varnish elevation part layer includes varnish and is formed via the varnish channel.

2. The method according to claim 1, wherein the spot color image comprises a URL at which details of the digital information are stored.

3. The method according to claim 1, wherein the step of receiving the digital information comprises the sub-step receiving multiple print orders for different sub-images of the digital image.

4. The method according to claim 3, wherein the step of the digital slicer deriving from the raster image a number of pass images to be printed on top of each other, comprises the sub-step of adapting for each sub-image the number of pass images of recording materials.

5. A print system for printing a digital image resulting in an elevated print on a support, said elevated print having a surface of varying height, in a number of pass images on top of each other in a number of passes, the print system comprising:
- a print controller configured to define the digital image comprising color data for each pixel of the digital image and height data for indicating a height of each pixel of the digital image;
- a raster image processor connected to the printing system and configured to rasterize the digital image into a raster image;
- a digital slicer connected to the printing system and configured to derive from the raster image a number of pass images to be printed on top of each other; and
- a print engine configured to print the pass images on top of each other by applying a number of recording materials on the support, wherein the print system is configured:
- to receive digital information related to the print order of the recording materials in the pass images for each pixel in order to achieve a visual effect;
- to transfer the digital information to the digital slicer;
- to derive from the digital information the print order of the recording materials in the pass images for each pixel; and
- to apply the recording materials for each pixel for each pass image derived by the digital slicer, wherein the step of transferring the digital information to the digital slicer comprises the sub-step of the raster image processor receiving the digital information and transferring the digital information unchanged to the digital slicer, wherein the sub-step of the raster image processor transferring the digital information comprises the step of using a spot color image to transfer the digital information unchanged to the digital slicer, wherein the visual effect is at least one out of a translucent elevation effect and a varnish elevation effect, wherein the translucent elevation effect is established by first a white part layer, then a varnish elevation part layer, and then a color part layer, the white part layer, the varnish elevation part layer, and the color part layer being printed on top of each other, wherein the varnish elevation effect is established by first the white part layer, then the color part layer and then a varnish elevation part layer, the white part layer, the color part layer and the varnish elevation part layer being printed on top of each other, wherein the varying height of the elevated print is provided by a varying height of the varnish elevation part layer, wherein the printing system comprises color channels for color inks (C, M, Y, W, K) and a varnish channel for varnish (V), and wherein the varnish elevation part layer includes varnish and is formed via the varnish channel.

6. A non-transitory software medium comprising executable program code configured to, when executed, perform the method according to claim 1.

7. The method according to claim 1, wherein the white part layer includes mainly a white colorant, and
wherein the color part layer is printed with different colors.

8. The print system according to claim 5, wherein the white part layer includes mainly a white colorant, and
wherein the color part layer is printed with different colors.

* * * * *